United States Patent [19]

Silveri

[11] Patent Number: 5,580,438
[45] Date of Patent: Dec. 3, 1996

[54] POOL PURIFIER ATTACHING APPARATUS AND METHOD

[76] Inventor: Michael A. Silveri, 483 Skylake Ct., Incline Village, Nev. 89451

[21] Appl. No.: 410,819

[22] Filed: Mar. 27, 1995

Related U.S. Application Data

[63] Continuation-in-part of Ser. No. 240,964, May 10, 1994, Pat. No. 5,401,373, which is a continuation of Ser. No. 105,365, Aug. 11, 1993, abandoned, which is a continuation of Ser. No. 770,074, Oct. 1, 1991, abandoned, which is a continuation-in-part of Ser. No. 759,692, Sep. 6, 1991, abandoned, which is a continuation of Ser. No. 680,591, Mar. 28, 1991, abandoned, which is a continuation of Ser. No. 597,085, Oct. 15, 1990, abandoned, which is a continuation-in-part of Ser. No. 424,305, Aug. 18, 1989, Pat. No. 4,992,156.

[51] Int. Cl.⁶ .............................. C02F 1/461; C25B 9/00
[52] U.S. Cl. ..................... 205/687; 205/742; 204/237; 204/269; 204/279; 210/169
[58] Field of Search ................................ 204/1.11, 269, 204/279, 237; 210/169; 205/687, 742

[56] References Cited

U.S. PATENT DOCUMENTS

| | | | |
|---|---|---|---|
| 844,262 | 2/1907 | Dietrich | 204/275 |
| 1,851,435 | 10/1927 | Jessup | 254/134.4 |
| 2,864,720 | 12/1958 | Hughes, Jr. et al. | 204/149 |
| 2,887,444 | 5/1959 | Lindstaedt | 204/152 |
| 3,092,566 | 6/1963 | Negus | 204/240 |
| 3,222,269 | 12/1965 | Stanton | 204/270 |
| 3,222,270 | 12/1965 | Edwards | 204/269 |
| 3,223,242 | 12/1965 | Murray | 210/139 |
| 3,283,123 | 11/1966 | Atkinson et al. | 219/307 |
| 3,305,472 | 2/1967 | Oldershaw et al. | 204/268 |
| 3,334,035 | 8/1967 | Dews et al. | 204/130 |
| 3,351,542 | 11/1967 | Oldershaw et al. | 204/149 |
| 3,361,663 | 1/1968 | Murray et al. | 204/278 |
| 3,378,479 | 4/1968 | Colvin et al. | 204/248 |
| 3,458,414 | 7/1969 | Crane et al. | 204/149 |
| 3,552,568 | 1/1971 | Wade | 210/169 |

(List continued on next page.)

FOREIGN PATENT DOCUMENTS

| | | |
|---|---|---|
| 205712 | 9/1973 | Argentina . |
| 206934 | 3/1974 | Argentina . |
| 206935 | 5/1974 | Argentina . |
| 43263 | 12/1973 | Australia . |
| 126365 | 4/1979 | Australia . |
| 11632 | 8/1983 | Australia . |
| 2080449 | 1/1971 | France . |
| 1140060 | 2/1971 | France . |
| 2227182 | 9/1990 | Japan . |
| WO8601543 | 3/1986 | WIPO . |
| WO9010734 | 9/1990 | WIPO . |

OTHER PUBLICATIONS

Halogen Systems Adverstisement (Mailer), distributed Sep. 1989.
Halogen Systems Advertisement (Flyer), distributed Nov. 1989.
Marks, L., *Mechanical Engineering Handbook*, pp. 258–259 (3rd Ed. 1930).

*Primary Examiner*—Donald R. Valentine
*Attorney, Agent, or Firm*—Knobbe, Martens, Olson & Bear

[57] ABSTRACT

A water purifier comprising an electrolytic cell housed in an enclosure and an attaching apparatus. The enclosure attaches over an outlet fitting of a water circulation line in a swimming pool by the attaching apparatus. The attaching apparatus and the enclosure define apertures and outlet openings, respectively, having increasing areas in the direction of the water flow. This configuration increases flow rates through the apertures and outlet openings; the increased flow rates break off scale formations extending into the center of the apertures and outlet openings and thereby prevent scale from clogging the purifier. The attaching apparatus also can be coupled directly to the water circulation line and can be adjusted to accommodate fittings and circulation lines of various sizes.

28 Claims, 12 Drawing Sheets

U.S. PATENT DOCUMENTS

| | | | |
|---|---|---|---|
| 3,563,879 | 2/1971 | Richards et al. | 204/272 |
| 3,669,857 | 6/1972 | Kirkham et al. | 204/151 |
| 3,684,460 | 8/1972 | Arneson | 23/267 A |
| 3,706,646 | 12/1972 | Gibson, Jr. et al. | 204/149 |
| 3,736,322 | 5/1973 | Helber et al. | 204/266 |
| 3,752,747 | 8/1973 | Treharne et al. | 204/149 |
| 3,766,045 | 10/1973 | Itakura et al. | 204/275 |
| 3,767,557 | 10/1973 | Lamm | 204/263 |
| 3,778,858 | 12/1973 | Fuller | 15/104.9 |
| 3,793,178 | 2/1974 | Austin et al. | 204/272 |
| 3,835,018 | 9/1974 | Casanovas et al. | 204/228 |
| 3,835,020 | 9/1974 | Galneder | 204/268 |
| 3,893,902 | 7/1975 | Loftfield et al. | 204/95 |
| 3,945,905 | 3/1976 | Persson | 204/212 |
| 3,957,599 | 5/1976 | Lindsay et al. | 204/105 R |
| 4,081,875 | 4/1978 | Nishino | 15/104.06 R |
| 4,085,028 | 4/1978 | McGallum | 204/269 |
| 4,097,356 | 6/1978 | Yates | 204/237 |
| 4,100,052 | 7/1978 | Stillman | 204/268 |
| 4,121,991 | 10/1978 | Miller et al. | 204/260 |
| 4,124,480 | 11/1978 | Stevenson | 204/268 |
| 4,129,493 | 12/1978 | Tighe et al. | 204/228 |
| 4,136,005 | 1/1979 | Persson et al. | 204/266 |
| 4,193,858 | 3/1980 | King | 204/268 |
| 4,196,068 | 4/1980 | Scoville | 204/255 |
| 4,200,230 | 4/1980 | Gould | 239/66 |
| 4,201,651 | 5/1980 | Themy | 204/217 |
| 4,202,738 | 5/1980 | Stillman | 204/95 |
| 4,229,272 | 10/1980 | Yates | 204/128 |
| 4,248,690 | 2/1981 | Conkling | 204/268 |
| 4,255,246 | 3/1981 | Davis et al. | 204/228 |
| 4,256,552 | 3/1981 | Sweeney | 204/98 |
| 4,263,114 | 4/1981 | Shindell | 204/149 |
| 4,290,873 | 9/1981 | Weaver | 204/228 |
| 4,334,968 | 6/1982 | Sweeney | 204/96 |
| 4,337,136 | 6/1982 | Dahlgren | 204/242 |
| 4,361,471 | 11/1982 | Kosarek | 204/128 |
| 4,363,713 | 12/1982 | Bindon | 204/278 |
| 4,368,550 | 1/1983 | Stevens | 4/507 |
| 4,411,759 | 10/1983 | Olivier | 204/260 |
| 4,419,207 | 12/1983 | Bindon | 204/237 |
| 4,422,919 | 12/1983 | Fabian et al. | 204/270 |
| 4,472,256 | 9/1984 | Hilbig | 204/266 |
| 4,492,618 | 1/1985 | Eder | 204/152 |
| 4,525,253 | 6/1985 | Hayes et al. | 204/149 |
| 4,535,255 | 8/1985 | Ochii et al. | 307/264 |
| 4,555,323 | 11/1985 | Collier | 204/258 |
| 4,565,617 | 1/1986 | Ahuja | 204/229 |
| 4,584,106 | 4/1986 | Held | 210/754 |
| 4,599,159 | 7/1986 | Hilbig | 204/266 |
| 4,613,415 | 9/1986 | Wreath et al. | 204/98 |
| 4,701,265 | 10/1987 | Carlsson et al. | 210/744 |
| 4,714,534 | 12/1987 | Fair et al. | 204/269 |
| 4,719,018 | 1/1988 | Pryzbylski | 210/748 |
| 4,726,564 | 2/1988 | Lynn | 254/134.4 |
| 4,767,511 | 8/1988 | Aragon | 204/128 |
| 4,789,448 | 12/1988 | Woodhouse | 204/228 |
| 4,790,923 | 12/1988 | Stillman | 204/268 |
| 4,818,389 | 4/1989 | Tobias et al. | 210/169 |
| 4,861,451 | 8/1989 | David | 204/230 |
| 4,935,980 | 6/1990 | Leginus et al. | 210/169 X |
| 4,936,979 | 6/1990 | Brown | 210/85 |
| 4,986,906 | 1/1991 | Dadisman | 210/169 |
| 4,992,156 | 2/1991 | Silveri | 204/228 |
| 4,997,540 | 3/1991 | Howlett | 204/271 |
| 5,013,417 | 5/1991 | Judd, Jr. | 204/228 |
| 5,034,110 | 7/1991 | Gore et al. | 204/228 |
| 5,037,519 | 8/1991 | Wiscombe | 204/237 |
| 5,059,296 | 10/1991 | Sherman | 204/228 |
| 5,094,734 | 3/1992 | Torrado | 204/234 |
| 5,228,964 | 7/1993 | Middleby | 204/194 |
| 5,254,226 | 10/1993 | Williams et al. | 204/128 |

FIG. 11
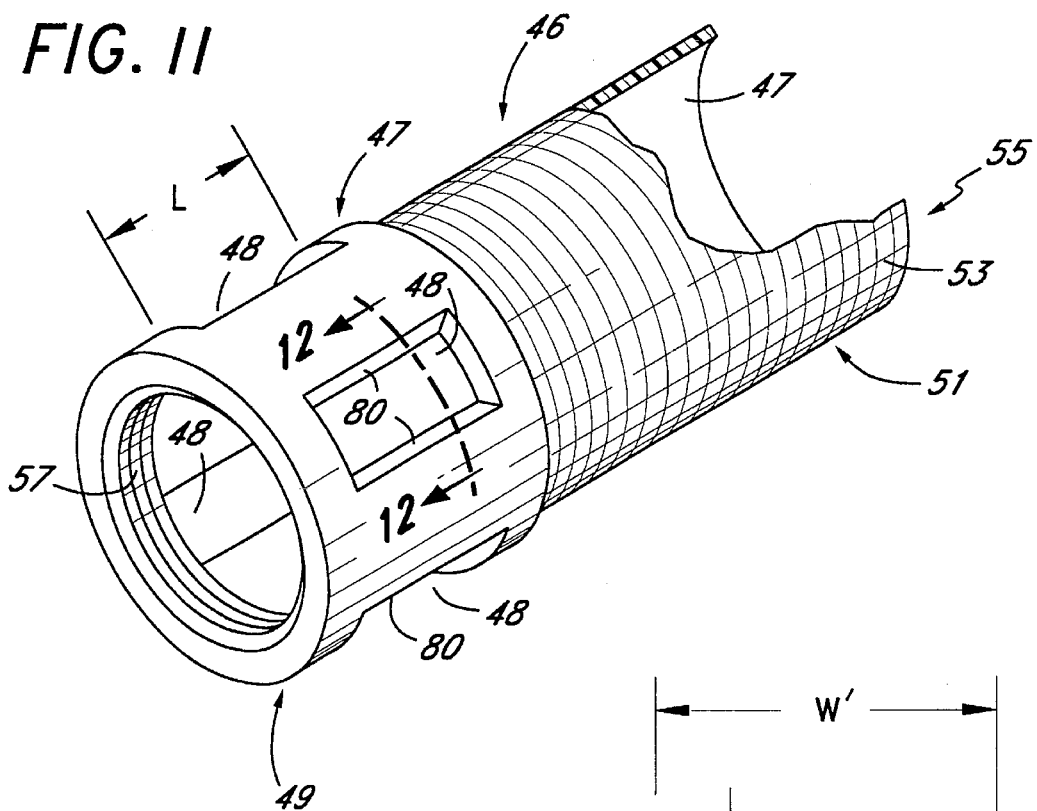
FIG. 12
FIG. 13
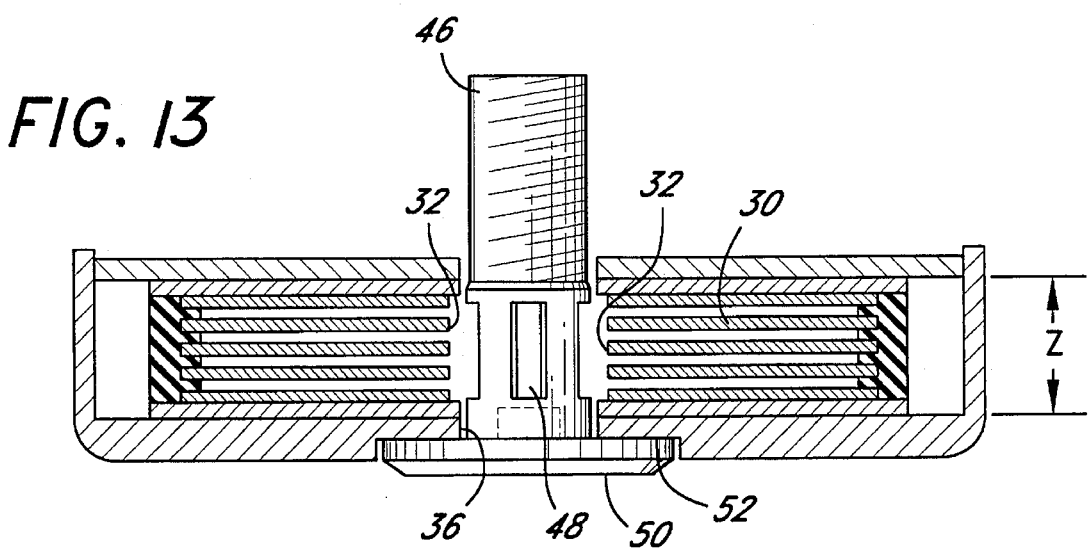

POOL PURIFIER ATTACHING APPARATUS AND METHOD

RELATED APPLICATIONS

This application is a continuation-in-part of application, Ser. No. 08/240,964, filed May 10, 1994, now U.S. Pat. No. 5,401,373 which is a continuation of an application Ser. No. 08/105,365 filed on Aug. 11, 1993, now abandoned which is a continuation of an application Ser. No. 07/770,074 filed on Oct. 1, 1991, now abandoned which is a continuation-in-part of an application Ser. No. 07/759,692, filed Sep. 6, 1991, now abandoned, which is a continuation of an application Ser. No. 07/680,591, filed Mar. 28, 1991, now abandoned, which is a continuation of an application Ser. No. 07/597,085, filed Oct. 15, 1990, now abandoned which is a continuation-in-part of an application Ser. No. 07/424,305, filed on Aug. 18, 1989, now U.S. Pat. No. 4,992,156.

BACKGROUND OF THE INVENTION

1. Field of the Invention

The present invention relates to a water purifier, and more particularly to a submerged electrolytic cell.

1. Description of Related Art

Sodium hypochlorite is commonly used as a sanitizing agent in swimming pools, and the like, to control bacteria growth. Typical pool maintenance requires adding liquid sodium hypochlorite to pool water. Some pool owners, however, use electrolytic cell devices in their pools or in their filtration systems to produce sodium hypochlorite by electrolysis. Examples of electrolytic cells used to generate sanitizing agents are disclosed in U.S. Pat. Nos. 4,992,156 and 4,790,923.

In water having a hardness greater than 700 parts per million ("hard water"), scale deposits from the water and builds up on surfaces adjacent to a water flow. If an electrolytic cell—and for that matter, pool equipment in general—is used in hard water, scale build-up causes water flow problem. Scale typically builds up and clogs small openings and conduits in the equipment. Thus, some manufacturers recommend using their equipment in water having a total hardness less than 500 parts per million.

SUMMARY OF THE INVENTION

An aspect of the present invention involves a pool purifier for mounting in a swimming pool. The swimming pool has a water circulation system which includes a pipe that communicates with the pool through a port positioned beneath the level of water in the pool. The pool purifier comprises an electrolytic cell which includes a plurality of electrodes. An enclosure forms a housing having an internal cavity in which the electrolytic cell is disposed. A coupler is releasably attached to the housing and is adapted to be secured to the pool at a position overlying the port of the water circulation system. The coupler including an inner conduit which defines a water flow path between the water circulation pipe and the enclosure.

In accordance with a preferred method of installing pool purifier in a swimming pool, the pool having a water circulation system including a pipe which communicates with the pool through a port positioned beneath the level of water in the pool, a pool purifier is positioned beneath the surface of the pool water and in front of the port of the circulation system. An electrolytic cell of the pool purifier is attached to the pool in this position so that water from the pipe flows across the cell.

BRIEF DESCRIPTION OF THE DRAWINGS

These and other features of the invention will now be described with reference to the drawings of preferred embodiments which are intended to illustrate and not to limit the invention, and in which:

FIG. 11 is a perspective view of a nipple of FIG. 2;

FIG. 12 is a partial cross-sectional view taken along line 12—12 of FIG. 11;

FIG. 13 is a cross-sectional view taken along line 13—13 of FIG. 4;

DETAILED DESCRIPTION OF THE PREFERRED EMBODIMENTS

Figure 1:
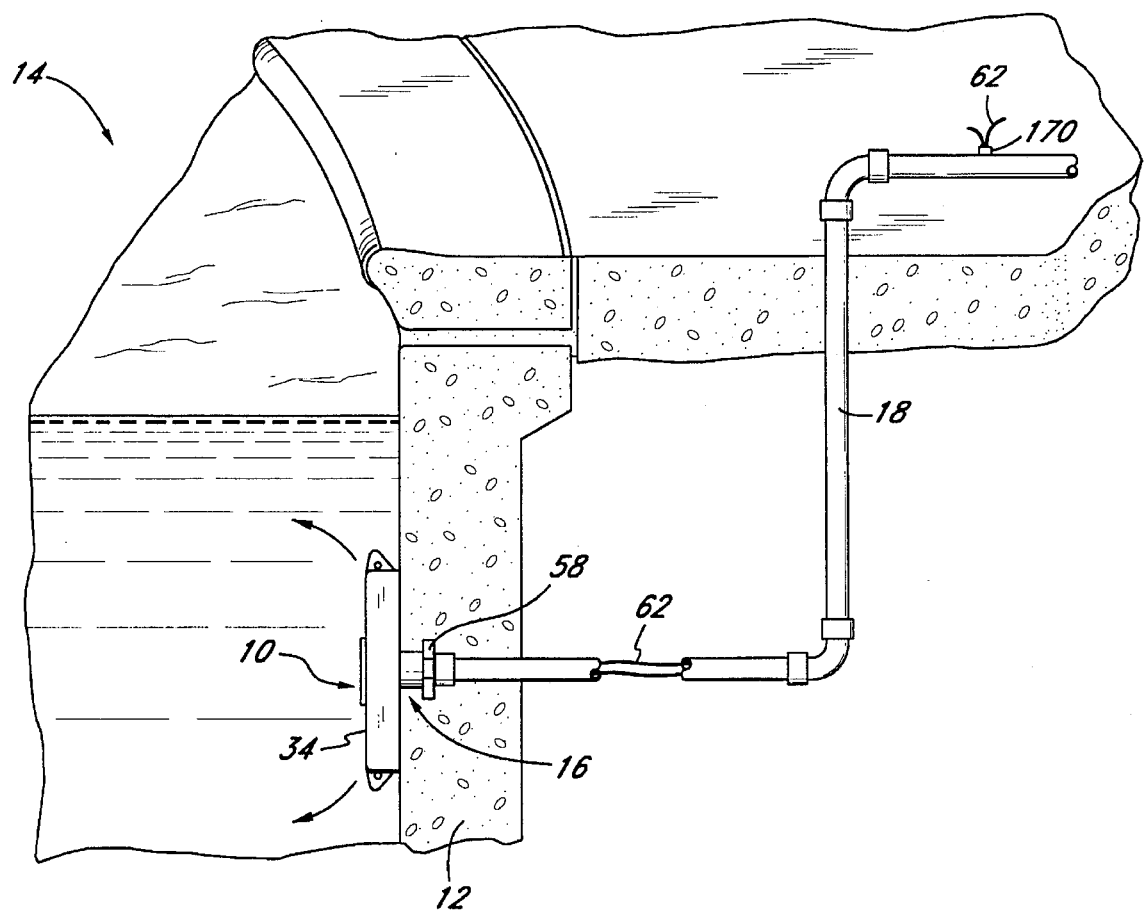
FIG. 1 illustrates a water purifier in accordance with one embodiment of the present invention attached to a side wall of a swimming pool.

FIG. 1 illustrates a sanitizing apparatus or purifier 10 of the present invention secured to a wall 12 of a swimming pool 14. Although the discussion of the purifier 10 proceeds in connection with a swimming pool, it is understood that the purifier 10 can also work with spas (i.e., Jacuzzies®), water fountains and the like.

Figure 2:
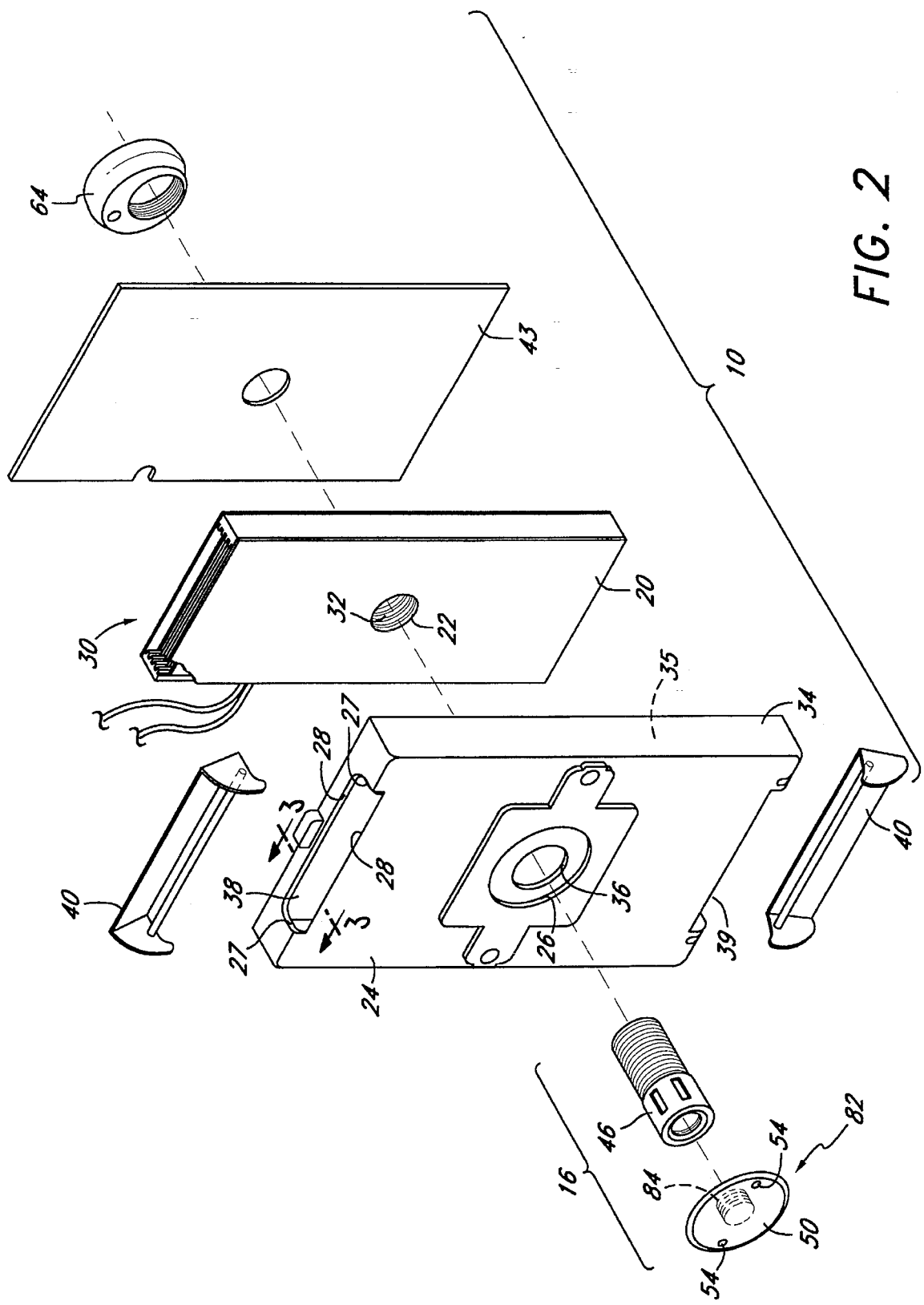
FIG. 2 is an exploded perspective view of the purifier of FIG. 1.

Referring to FIGS. 1 and 2, the purifier 10 comprises an electrolytic cell 30 housed in an enclosure 34 and an attaching apparatus or coupler 16 for securing the electrolytic cell 30 to the pool wall 12. The attaching apparatus 16 is located at an exit port of a water circulation line 18. As a result, pressurized water exiting the water circulation line 18 flows through the enclosure 34, passing over the electrolytic cell 30. As discussed in detail below, the resulting water stream aids in reducing scale build-up on the electrolytic cell 30, the enclosure 34 and the attaching apparatus 16.

As illustrated in FIG. 2, the electrolytic cell 30 is generally configured in accordance with the teachings of U.S. Pat. No. 4,992,156, issued on Feb. 12, 1991, which is hereby incorporated by reference. The electrolytic cell 30 comprises a plurality of juxtaposed electrode plates 20. Each electrode plate 20 has a rectangular shape and defines an aperture 22 at its center. As juxtaposed, the electrode plates 20 define a cylindrical bore 32 having an axis perpendicular to the electrode plates 20.

The enclosure 34 fully encompasses the electrolytic cell 30 within an internal cavity 35. The enclosure 34 is molded of a thermoplastic, and defines an aperture 36 extending through the enclosure 34; the aperture 36 aligns with the bore 32 of the electrolytic cell in assembly. As a result, a portion of the attaching apparatus 16 (namely a nipple 46) passes partially through the enclosure 34 and the electrolytic cell 30 in assembly. A front panel 24 of the enclosure includes a recess 26 having a larger diameter than the aperture 36 and circumscribing the aperture 36.

The enclosure 34 additionally comprises a top opening 38 and a bottom opening 39, providing exit ports for water flowing through the enclosure 34 from the water circulation line 18. The openings 38, 39 also provide a flow path for water circulating through the enclosure 34 as a result of the electrolytic process. With a circulation pump off, the electrolysis generates gaseous bubbles which travel through the enclosure 34 towards the surface of the pool water. The natural movement of the bubbles produces a current flow of water through the enclosure 34, entering through the bottom opening 39 and exiting through the top opening 38.

Figure 3:
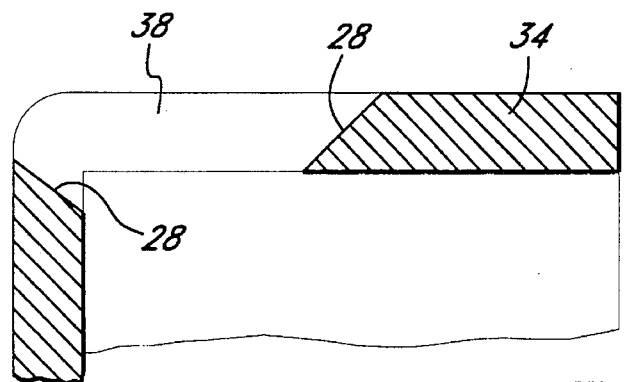
FIG. 3 is a partial cross-sectional view taken along line 3—3 of FIG. 2.

As illustrated in FIG. 2, the top opening 38 has generally a rectangular configuration defined by four edge surfaces 27, 28. Two of the edge surfaces 28, as best seen in FIG. 3, comprise chamfers, angling away from the defined opening 38. The opening 38 increase in area in an outward direction as a result of the chamfer configuration of the edge surfaces 28. As used herein, the "area" of an opening aperture, or orifice is measured across a plane of the opening, aperture or orifice perpendicular to the water flow. The bottom opening 39 has an identical configuration. This configuration increases water flow rate through the openings 38, 39; water flowing through the openings 38, 39 remains in a concentrated stream and does not diffuse at the outer edges of the openings 38, 39. As a result, the flow rate through the openings 38, 39 increases as water passes through the openings 38, 39.

The increased flow rate reduces scale formations which clog the openings 38, 39. Scale, in hard water, deposits on the edges 27, 28 of the openings 38, 39 and builds outwardly in a stalagmite fashion, away from the edge surfaces 27, 28. The increased flow, however, limits the growth of the scale deposit. The increased water current fractures the stalagmite structure extending into the center of the current. Thus, scale is less likely to bridge the openings 38, 39 and to reduce the flow of water through the purifier 10.

About each opening 38, 39, the enclosure includes a directional diffuser 40. The directional diffusers direct water flow exiting the openings 38, 39 towards the center of the pool 14. As illustrated in FIG. 2, each diffusers preferable includes a metal rod 41 extending longitudinally across the diffuser. The rods act as a grate or guard, preventing objects smaller than the openings 38, 39 from entering the openings.

Figure 4:
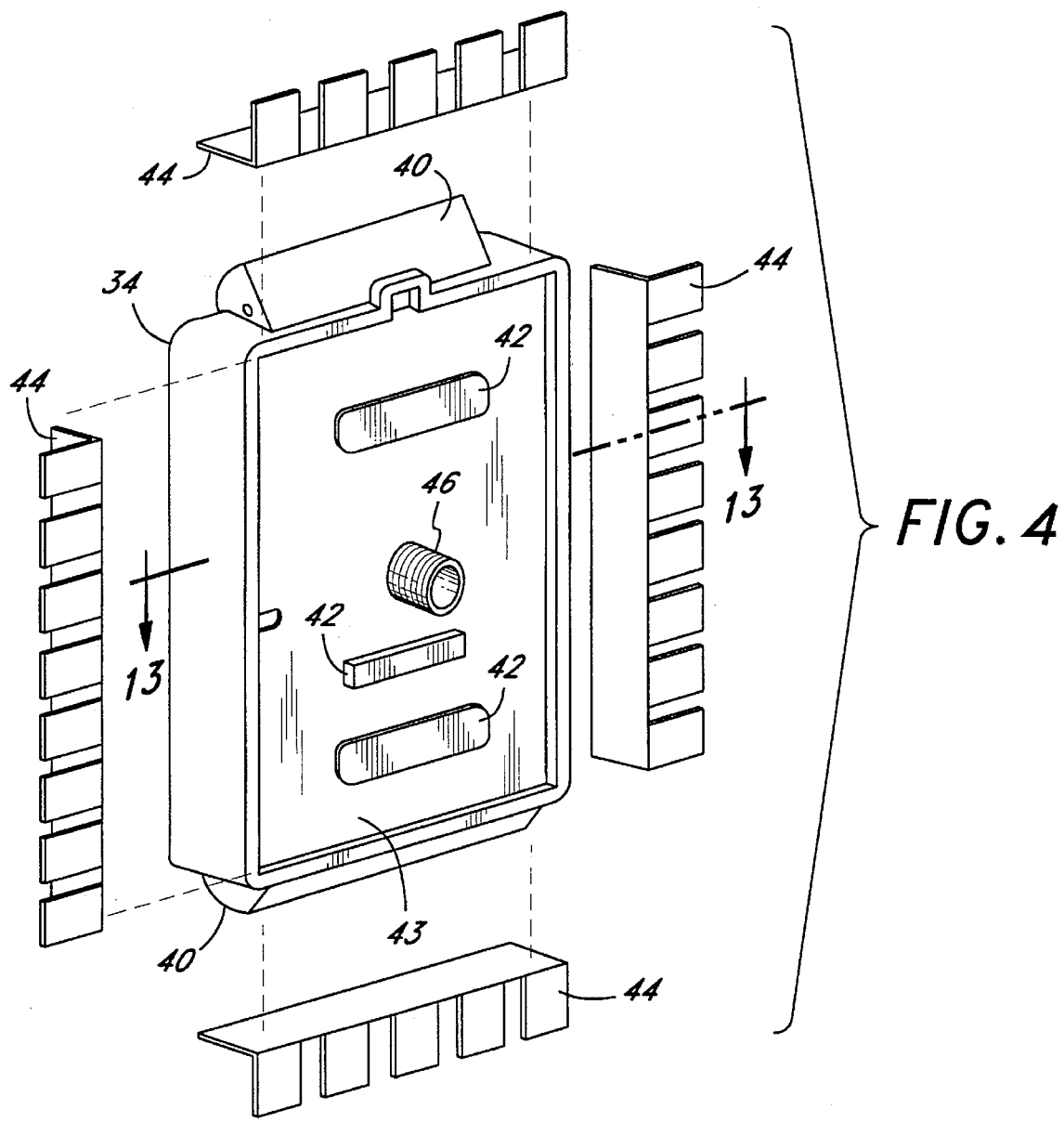
FIG. 4 is a partial rear perspective view of the purifier of FIG. 1, illustrated with wall spacers.
Figure 5:
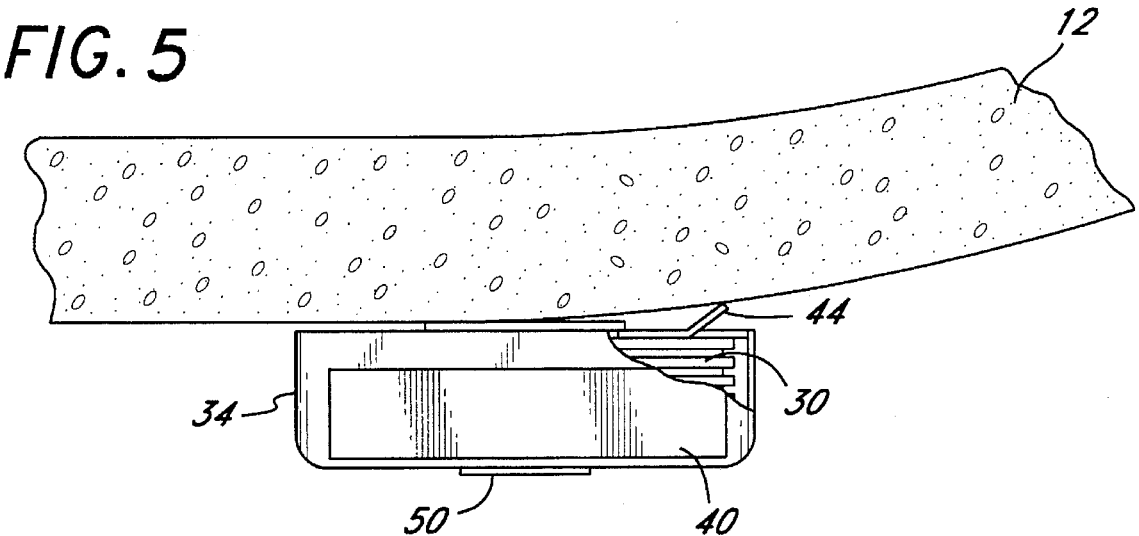
FIG. 5 is a plan view of the purifier of FIG. 1 mounted to a curved pool wall.

Referring to FIG. 4, the enclosure 34 also includes two flange brackets 42 integrally mounted onto a back panel 43 of the enclosure 34. These brackets 42 receive several spacers 44 which wedge between the enclosure 34 and the pool wall 12 to blend with the contoured (or otherwise not flat) surface of the pool wall 12, as illustrated in FIG. 5. Although FIGS. 4 and 5 illustrate the purifier 10 as having four rectangular spacers 44, the proper combination and shape of the spacers 44 is dictated by the shape and contour of the pool wall 12.

Figure 6:
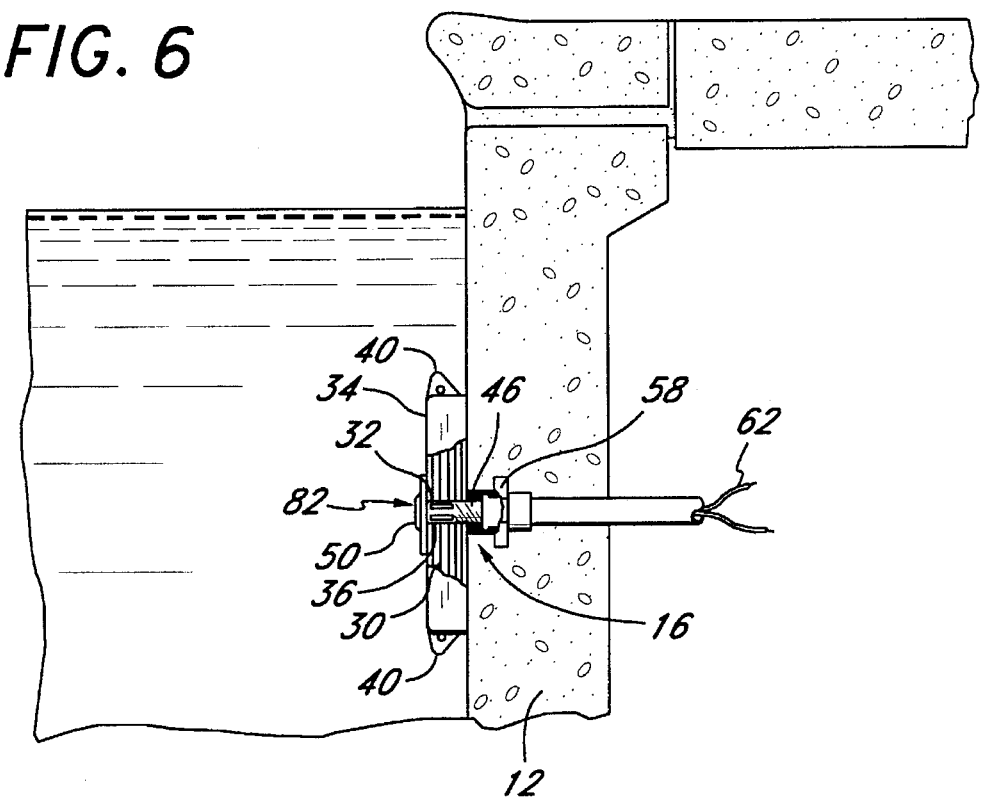
FIG. 6 is a partial cross-sectional view of the purifier of FIG. 1 attached to an existing pool fitting embedded in the pool wall.

Referring to FIG. 6, the attaching apparatus 16 secures the enclosures 34 to the pool wall 12. The attaching apparatus advantageously utilizes an existing fitting 58 of the water circulation line 18 located on the pool wall 12. Pools commonly include at least one exit port fitting 58 positioned in the pool wall 12 below the water line and in communication with the water circulating system. Employing the existing fitting 58 reduces the cost and time associated with installation of the purifier 10.

Figure 7:
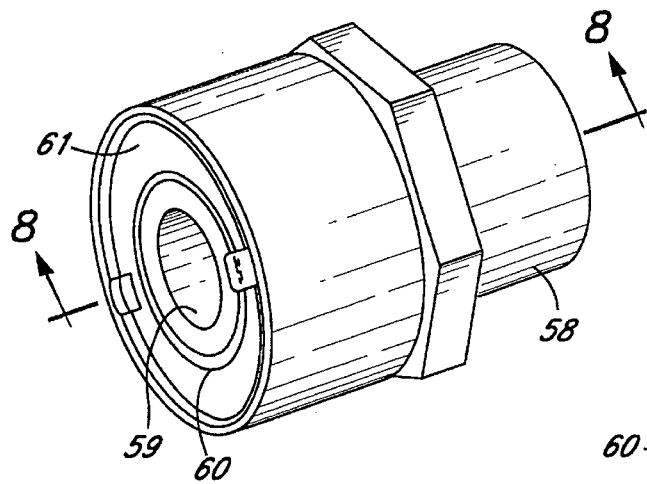
FIG. 7 is a perspective view of a unmodified pool fitting.
Figure 8:
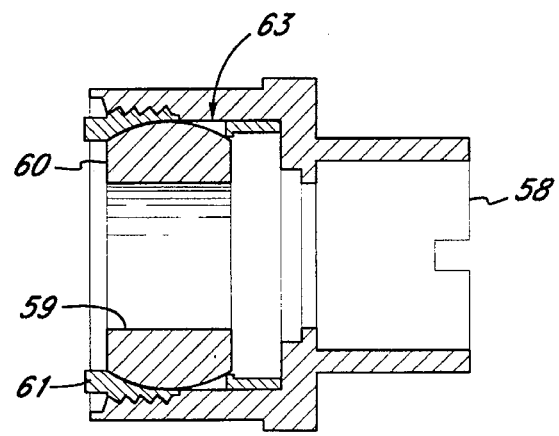
FIG. 8 is a cross-sectional view taken along line 8—8 of FIG. 7.

As illustrated in FIGS. 7 and 8, the fitting 58 conventionally includes an eyeball-shaped directional discharger 60 having a central aperture 59. The directional discharger 60 has a spherical shape with two symmetric sides truncating the spherical shape along vertical planes. As best seen in FIG. 8, a correspondingly shaped retainer ring 61 secures the directional discharger 60 within a socket 63 of the fitting 58 and thereby permits rotation of the discharger 60 in the fitting socket 63.

Figure 9:
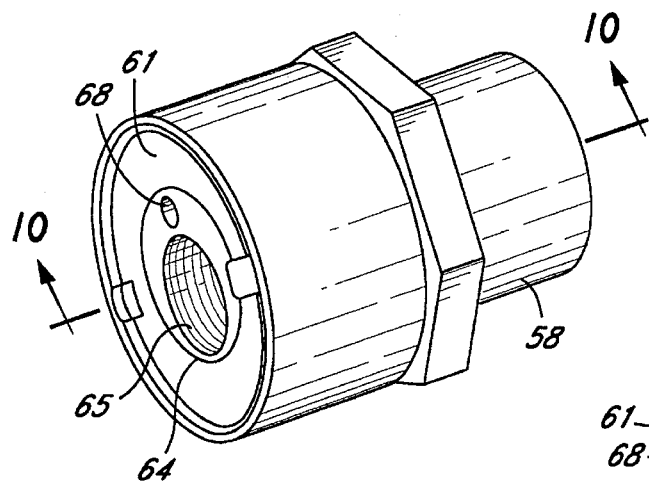
FIG. 9 is a perspective view of the pool fitting of FIG. 7, with a directional nozzle configured in accordance with the present invention inserted into the fitting.
Figure 10:
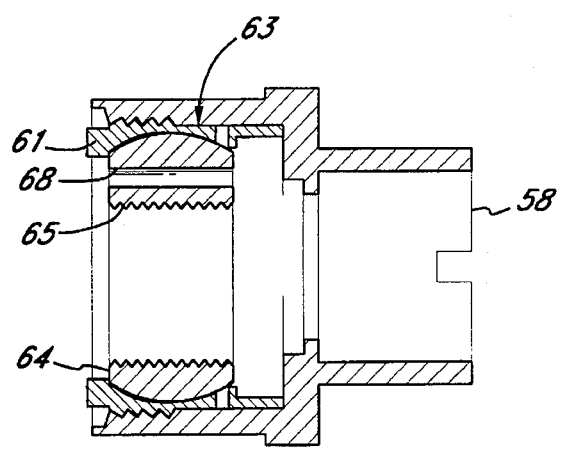
FIG. 10 is a cross-sectional view taken along line 10—10 of FIG. 9.

Referring to FIGS. 9 and 10, the attaching apparatus 16 comprises a similarly shaped directional discharger 64 having a thread hole 65 offset from the center of the directional discharger 64 and a wire passageway 68. The existing retainer ring 61 retains the modified directional discharger 64 within the existing socket 62, as illustrated in FIG. 10.

As seen in FIGS. 2 and 6, the attaching apparatus 16 additionally comprises a nipple or nozzle 46. FIG. 11 illustrates the nipple 46 having a generally tubular shape body 45 with an internal flow passage 47. The nipple body 45 defines a plurality of equally spaced apertures 48 proximate to a cap end 49. Although FIG. 11 illustrates the nipple body 45 as defining four apertures, it is understood that any number of apertures 48 can be used as well. The nipple may further include a shoulder 52 positioned between the apertures 48 and the threaded connector 46 for use with the clamp assembly of FIG. 21, as described below. Proximate to the apertures 48, the nipple 46 includes internal threads 57 extending into the flow passage 47 from the cap end 49. The nipple 46 also includes a connector 51 having a threaded exterior 53 extending from an engagement end 55 which engages the threaded hole 65 of the directional discharger 64 in assembly.

To prevent scale accumulation in the nipple apertures 48, the apertures 48 have a configuration increasing in area in the radial direction perpendicular to the water flow. As illustrated in FIG. 12, chamfered edges 80 define the apertures 48; the edges 80 angle outwardly from a radius of the tubular nipple 46 by an incline angle θ. Preferably, the incline angle θ ranges between 30° and 60°, and more preferably equals about 45°. As discussed above in connection with the enclosure openings 38, 39, this configuration increases flow rate through the apertures 48. The resulting water jet fractures scale formations extending from the chamfered edges 80.

Although FIG. 11 illustrates the apertures 48 as having a rectangular configuration, it is understood that other aperture configurations, such as, for example, oval or circular shapes, can be used as well. The particular aperture configuration must be sized to produce a sufficient flow rate to break off scale formation accumulating on the edges 80 of the apertures 48. The aperture size, however, should not be too small, as scale and other objects will easy clog the apertures 48.

For example, the rectangular apertures 48 illustrated in FIGS. 11 and 12 have lengths L in the longitudinal direction, widths W at the interior surface of the nipple body, and widths W' at the exterior surface of the nipple body. These dimensions are measured perpendicular to the water flow through the apertures 48. Preferably, the widths W of the apertures 48 ranges between about $\frac{1}{16}$th inch and $\frac{3}{8}$th inch, and more preferably equals about $\frac{3}{16}$th inch for water flowing into the nipple 46 under 2–3 pounds per square inch of pressure.

As illustrated in FIGS. 11 and 13, the longitudinal length L of the aperture chamfer edges 80 is equal to about the stacked width Z of the juxtaposed electrodes 20. As a result, water exiting the apertures 48 flows over the electrode surfaces.

Referring to FIGS. 2 and 6, the attaching apparatus 16 further includes a cap 82 comprising a flange disk 50 and a threaded shank 84 (FIG. 2). The threaded shank 84 is sized to engage the internal threads 57 of the nipple 46, without interfering with water flow through the nipple apertures 48. Although the FIGS. 2, 6 and 11 illustrate the cap 82 as including the externally threaded shank 84, it is contemplated that the cap could include internal threads, and the nipple cap end 49 could include external threads. Additionally, other type of connections, such as, for example, a male-female snap-type connector, can be used as well to removably connect together the cap 82 and cap end 49 of the nipple 46.

The flange disk 50 has a shape commensurate with that of the enclosure recess 26 and is larger in diameter than the enclosure aperture 36. In assembly, the flange disk 50 fits flush with the front panel 24 of the enclosure 34. The flange disk 50 defines two or more cavities 54 that mate with an installation tool. The tool is used to tighten the cap 82 onto the nipple 46, and is used in turn to tighten the nipple 46 into the directional discharger 64.

The attaching apparatus 16, especially the nipple 46, is preferably formed of a generally inert plastic, such as, for example, Teflon® or a high molecular weight polyethylene. Scale does not adhere well to these types of plastics.

In assembly, the directional discharger 64 fits within the socket 63 of the existing fitting 58 with the retainer ring 61 securing the discharger 64 in place. The nipple 46 threads into the threaded discharger hole 65 and cantilevers away from the pool wall 12. An electrical wire 62 (FIG. 6), connected to the electrolytic cell 30, threads through the wire passageway 68. The enclosure 34 secures to the pool wall 12 by sliding over the nipple 46; the enclosure aperture 36 and electrode bore 32 receive the nipple 46. The cap 82 secures the enclosure 34 and electrolytic cell 30 in place by threading into the end cap 49 of the nipple 46. As assembled, the enclosure 34 abuts against the pool wall 12; however, if the pool wall is curved, edge spacers 44 are placed against the flange brackets 42 prior to tightening. The edge spacers 44 can be trimmed or contoured to the pool wall 12 configuration.

Assembled with the fitting socket 62, the nipple communicates with the water circulation line 18. Pressurized water flows inside the tubular nipple 46 and disperses through the apertures 46. As mentioned above, water exiting the apertures 46 flows over each electrode surface 20 and exits through the outlet openings 38, 39.

Figure 14:
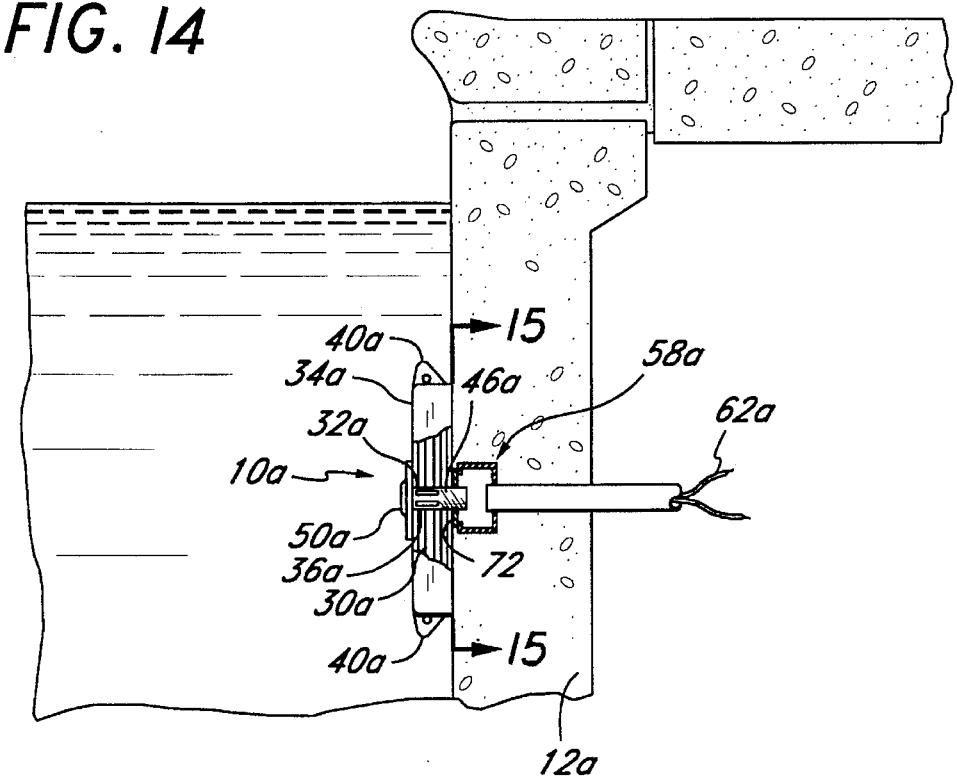
FIG. 14 is a cross section of a pool illustrating a purifier in accordance with a second embodiment of the present invention attachment to a discharge wall fitting.
Figure 15:
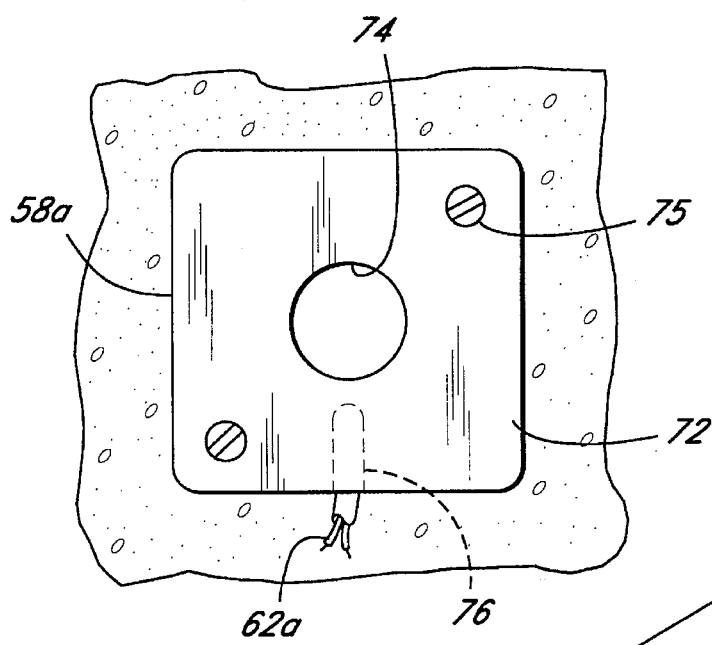
FIG. 15 is a cross-sectional view taken along lines 15—15 of FIG. 14, illustrating an attaching plate in accordance with the purifier of FIG. 14 attached to the wall fitting.
Figure 16:
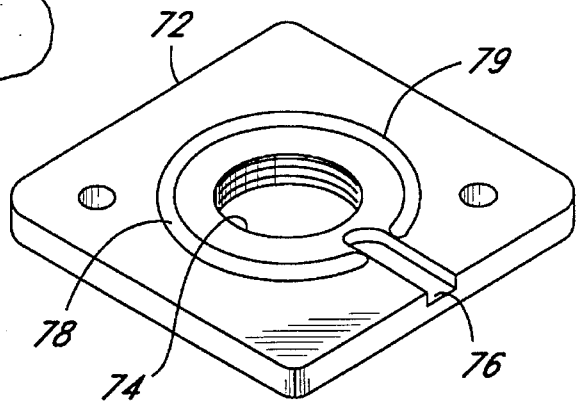
FIG. 16 is a rear perspective view of the wall plate shown removed from the purifier for clarity.

FIGS. 14 through 16 illustrate an other embodiment of the coupler 16 for use with another type of pool fitting 58. Where appropriate, like numbers with an "a" suffix are used to indicate like parts of the two embodiments for ease of understanding. Instead of a directional type fitting 58, as previously described, the fitting, as shown in FIG. 14, comprises a wall fitting 58a surrounding an end of the water circulation line 18. If the wall fitting 58a contains a grill or diffuser, it is removed and not used. As depicted in FIGS. 14 and 15, a plate 72 attaches over the fitting 58a in place of a grill.

Referring to FIG. 15, the plate 72 is constructed of thermoplastic and defines a threaded centrally located hole 74 and an offset wire receiving slot 76 near the hole. An O-ring 78, as seen in FIG. 16, fits into a groove 79 and partially encircles the hole 74, terminating at the slot 76. As shown in FIG. 15, the slot 76 permits the wires 62 to extend from the wall fitting 70 towards the purifier 10.

The installation of the purifier 10 is identical to the procedure described above, except that fasteners 75 (FIG. 15), such as, for example, screws, securely fasten the plate 72 to the pool wall 12. The nipple 46 is threaded into the hole 74 and the enclosure abuts against the plate, compressing the O-ring 78 between the plate 72 and the pool wall 12.

The plate 72 can also be used where the circulation line 18 extends to the surface of the pool wall 12. That is, the pool does not include the wall fitting 58a. The plate mounts directly to the pool wall, aligning with and covering over the end of the water circulation line 18. The attaching apparatus 16 and enclosure attach to the plate 72, as described above.

Figure 17:
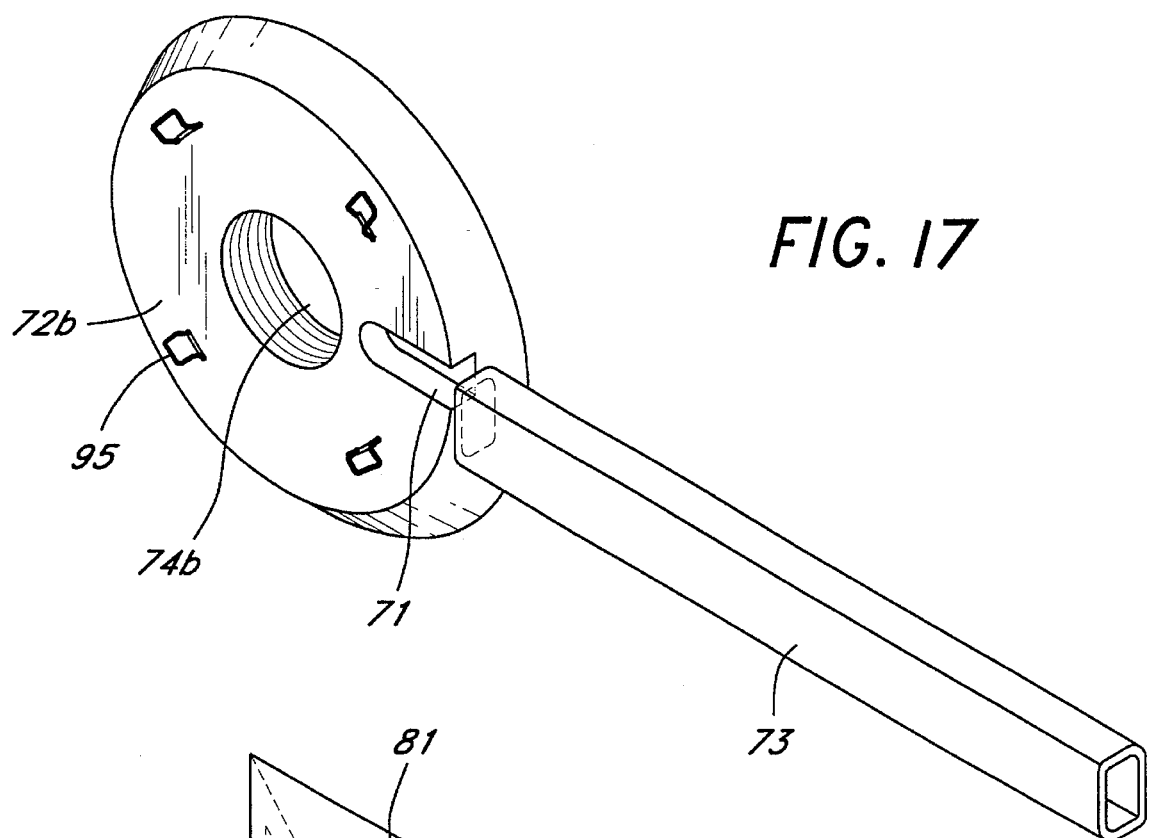
FIG. 17 is a perspective view another embodiment of a wall plate including to an extrusion for carrying wires.

FIG. 17 illustrates another embodiment of a plate 72b which can be attached over the wall fitting 58a (see FIG. 14) or used with a "shotgun-type" return which is flush with the pool wall 12. Where appropriate, like numbers with a "b" suffix have been used to indicate like parts between the embodiments illustrated in FIGS. 14 and 17.

The plate 72b generally has a cylindrical shape and includes a central threaded hole 74b. The hole is sized to receive the threaded end 51 of the nipple 46. The sides of the plate desirably are slightly skewed to give the plate a frusto-conical shape.

When using this wall plate attachment, the wires 62 from the electrolytic cell 30 may be run through the return line 18 or externally along the wall 12 of the pool. When the wires are to be run outside of the pool, the plate 72b desirably includes a slot 71 and an elongated extrusion 73 connected to the slot 71 in the plate 72b.

The extrusion 73 is desirably formed of a material which is UV resistant and is generally resistant to the effects of chlorinated water. Suitable materials include PVC and acrylonitrile-butadiene-styrene (ABS).

The extrusion 73 preferably is seated in the plate 72b to prevent the extrusion from being pulled away from the plate 72b once installed in the pool. The extrusion also can be bonded or otherwise attached to the side 12 of the pool using a suitable underwater epoxy, wall mounted clips, cable ties or the like.

The extrusion 73 extends upwardly along the wall 12 of the pool and carries the wires 62 from the plate 72b to the pool deck. The wires 62 can then be wrapped around the pool coping. Alternatively, holes can be drilled through the cantilever of the pool coping and the wire threaded through the holes to bring them up on the deck. Outside the pool, the wires 62 are run through electrical wire covers, such as the wire cover 77 illustrated in FIG. 18, which protect the wires on the pool deck.

Figure 18:
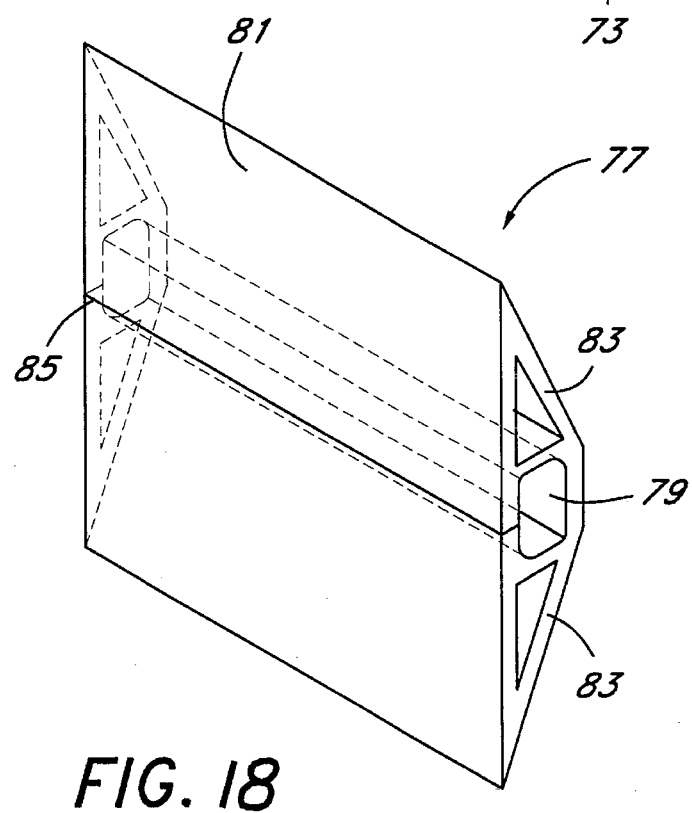
FIG. 18 is a rear plan view of the wall plate of FIG. 17.

As seen in FIG. 18, the cover 77 includes a central conduit 79 which can either receive the wires 62 or the extrusion 73. The cover 77 also includes a large flat base 81 and side surfaces 83 which ramp upward toward the center of the cover 77. The cover 77 also comprises a central slit 85 which spreads open when the ends of the base 81 are bent upward to expose the central conduit 79. In this manner, the wires 62 or the extrusion 73 can easily be placed within the central conduit 79.

The large flat base 81 stabilizes the cover 77, while the ramped sides 83 lessen the obtrusiveness of the cover 77 on the pool deck. That is, because of its tapered, low profile, the cover 77 is less of an obstacle. People are less likely to trip over the cover 77 and items such as lounge chairs can easily be rolled over the cover 77. The cover 77 thus protects the wires 62 while preventing people from tripping over them.

The wire cover 77 is preferable made of a UV-resistant, chemical-resistant material which can be bonded to cement or other masonry (e.g., brick, stone, etc.). In a preferred embodiment, the covers 77 are formed of ethylene propylene polymethylene diene (EPDM). The covers 77 desirably are molded or extruded in a variety of colors or otherwise colored (e.g., painted) to generally match the pool decking.

In use, the cover 77 can either be laid over the pool deck or attached to the decking using a conventional epoxy or like adhesive. For example, the cover 77 can be bonded to the decking or to the pool wall 12 using a suitable marine epoxy for use with EPDM, such as that sold by Master Bond of Hackensack, N.J., Catalog No. EP21TDC-7.

The cover 77 also can extend from the deck, around the coping of the pool, and down the pool wall 12 to the purifier 10, eliminating the need for the extrusion 71. The cover 77 can be bonded to the pool coping and the pool wall 12 using a suitable epoxy, such as, for example, Master Bond epoxy, Catalog No. EP21TDC-7. In this manner, the wires 62 can be conveniently and safely routed from a remote power supply to the pool purifier 10 positioned within the pool.

Figure 19:
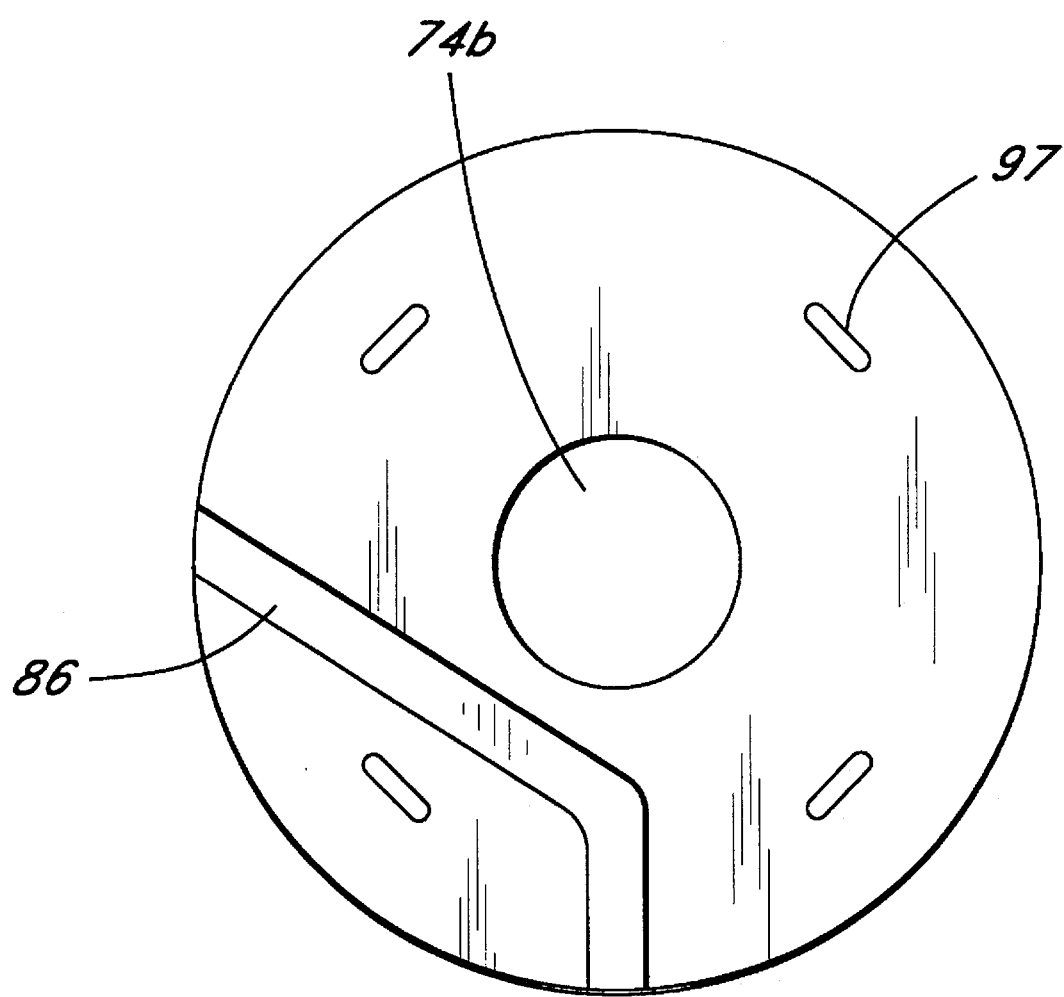
FIG. 19 is a perspective view of a wire cover.

With reference to FIG. 19, the plate 72b also desirably includes a diagonal slot 86 on its rear surface. When attached to the pool wall 12, the slot 86 provides an egress for the wires 62 when the wires 62 are routed through the water circulation line 18 and the plate 72b is mounted against the pool wall 12. The diagonal shape of the slot 86 allows the wires 62 to be routed either to the side or to the end of the pool purifier 10.

The plate 72b may be mounted to the wall 12 of the pool over the wall fitting or return line using a suitable underwater epoxy or cement as well known the those skilled in the art. The epoxy desirably sets up underwater in a reasonable amount of time (e.g., 10 minutes) and has a paste-like consistency to be easily applied. One possible underwater adhesive which can be used to mount the plate 73b to the pool wall 12 is commercially available from Master Bond of Hackensack, N.J., Catalog No. U735U.

A clamp 87, such as that illustrated in FIG. 19, can be used to hold the plate 72b against the pool wall 12 while the epoxy or cement cures. The clamp 87 also ensures that the plate 72b is mounted level against the wall 12, even though the fitting or return line 12 may be skewed with respect to the pool wall 12.

The clamp 81 includes two arms 88, 89 arranged in a scissor-like configuration and a spring 90 positioned between the arms 88, 89. The arms 88, 89 extend through the central hole 74b in the plate 72b and are joined at a pivot point 91. When the pivot point 91 is positioned within the hole 74b, the spring 90 exerts a force which acts to keep the arms 88, 89 separated while applying pressure to the plate 72b during the curing process.

To attach the plate 72b to the pool wall 12, the epoxy or cement is applied to the rear surface of the plate 72b. The plate 72b is then positioned on the wall 12 over the fitting or the return end. The clamp 87 is inserted through the central hole 74b in the plate 72b and adjusted to hold the plate 72b straight with respect to the pool wall 12 while the cement or epoxy cures.

Installation of the purifier 10 is identical to the procedure described above once the plate 74b is attached to the wall 12. That is, the nipple 46 threads into the threaded hole 74b and cantilevers away from the pool wall 12. An electrical wire 62, connected to the pool purifier, is threaded either through the front slot 71 or through the rear groove 86, and then routed either through the circulation line 18 or over the pool deck, as described above.

As understood from FIGS. 17 and 19, the plate 72b can includes a plurality of apertures 97 with receive clips 95 that are spaced about the central hole 74b. The excess length of the wire 62, which is necessary to remove the purifier 10 from the pool without detaching the wire from the extrusion 71 or removing the wire from the return line 18, can be wrapped around to clips 95 for storage before attaching the pool purifier 10 to the plate 72b.

The enclosure secures to the pool wall 12 by sliding over the nipple 46; the enclosure aperture 36 and electrode bore 32 receive the nipple. The cap 82 secures the enclosure 34 and electrolytic cell in place by threading into the end cap 49 of the nipple 46. As assembled, the enclosure 34 generally abuts against the pool wall 12 over the plate 72b, and the nipple 46 communicates with the water circulation line 18.

Figure 21:
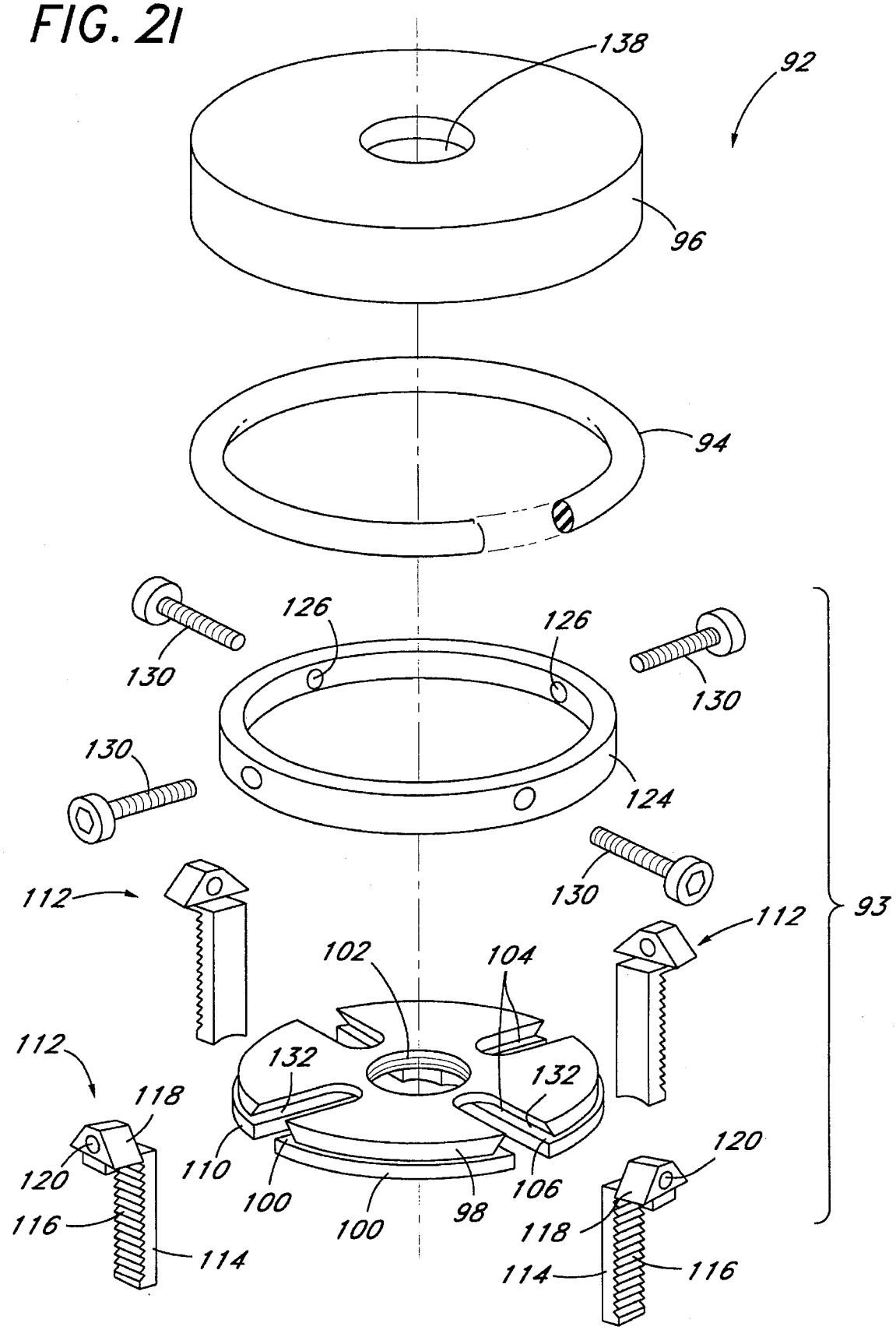
FIG. 21 is an exploded view of an adjustable coupling configured in accordance with another embodiment of the invention.
Figure 22:
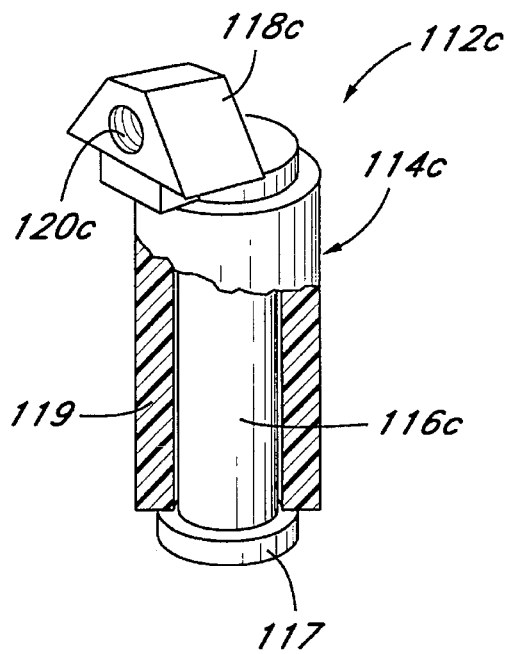
FIG. 22 is a perspective view of an additional embodiment of a jaw member used with the adjustable coupling of FIG. 21.

FIGS. 21 and 22 illustrate another coupler used to secure the pool purifier 10 to the pool wall 12 over the water circulation line 18. The coupler includes a nozzle 46 which is configured in accordance with the above description and a clamp assembly 92 which is attached to the existing pool fitting or the outlet of the return line 12.

Figure 20:
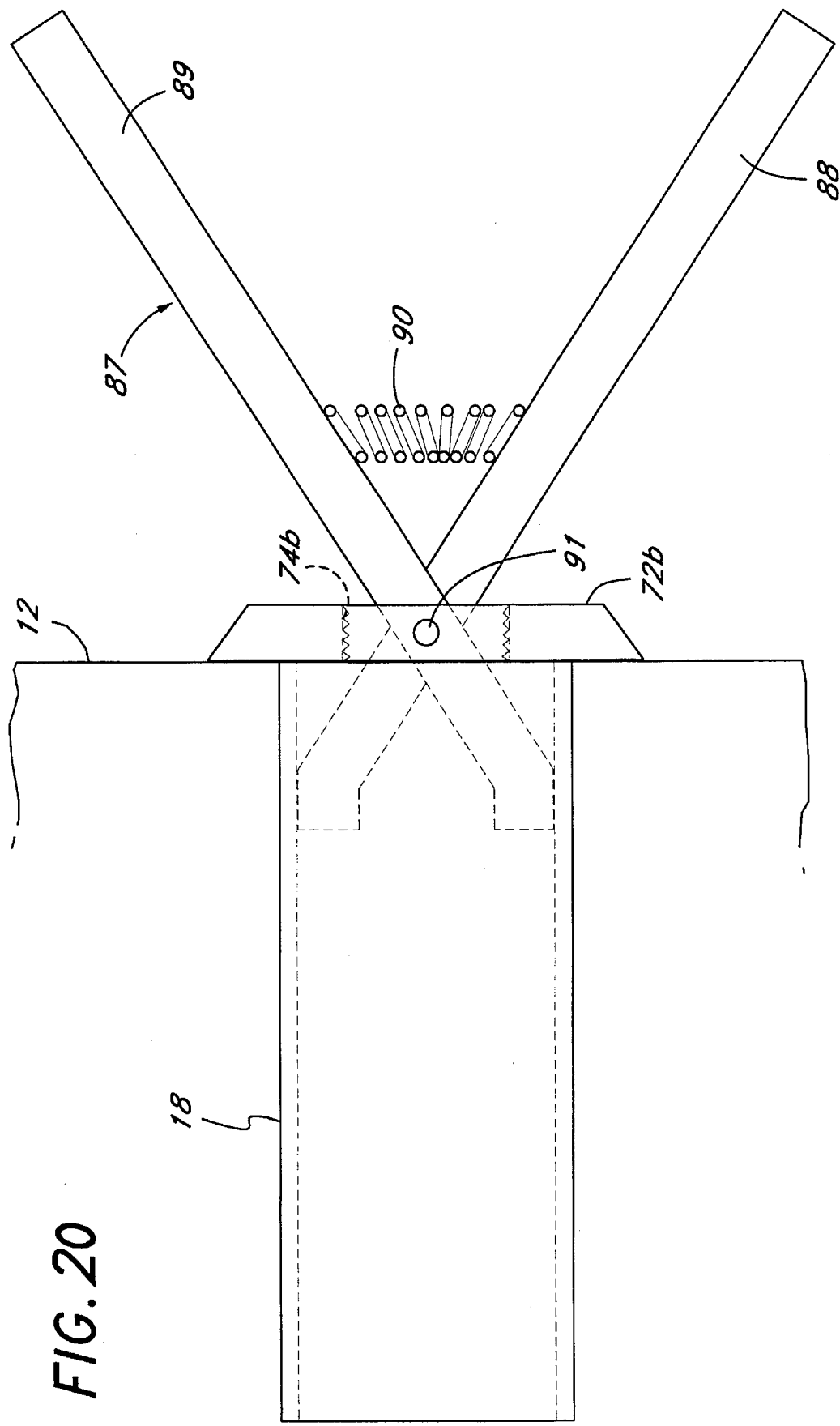
FIG. 20 is a side view of a clamp used to hold the wall plate of FIG. 17 against the pool wall during the curing process.

As illustrated in FIG. 20, the clamp assembly 90 comprises an adjustable jaw assembly 93, a seal 94, and a cover 96. The adjustable jaw assembly 92 includes first and second generally circular plates 98, 100, each of which includes a central threaded opening 102 and a plurality of U-shaped channels 104.

In the illustrated embodiment, the plates 98, 100 include four U-shaped channels 104 positioned radially symmetrically around the plates 98, 100, although a fewer or greater number of channels can be used. The first plate 98 has a smaller diameter than the second plate 100 such that when the plates 98, 100 are concentrically aligned, the second plate 100 creates a ridge 106 within each channel 104 and about the circumference of an outer edge 110 of the plates 98, 100.

The plates 98, 100 may be attached by welding, bonding or any other suitable attachment method. Further, although two separate plates have been illustrated, it will be appreciated that a single plate could also be used and molded or machined to achieve a similar configuration.

A jaw member 112 is associated with each channel 104 and sized to move within the channel 104. Each jaw member 112 comprises a head 118 having a threaded aperture 120 and a stud 114 which projects from the head 118. In the illustrated embodiment, the head 118 generally has a trapezoidal shape which sits on the ridge 106 in the corresponding channel 104 with the stud 114 extending through the channel 104.

As understood from FIG. 21, the stud 114 has a slightly arcuate shape and supports a series of thread crests and roots, generally designated by reference numeral 116, on its outer side. The spacing between adjacent threads crests desirably corresponds to a standard pipe thread size, such as, for example, 1½ NPS (i.e., 11.5 threads per inch typical). In this manner, the threaded outer surface 116 of the stud 114 can engage standard internal threads formed in the pipe fitting 58 or at the end of the circulation pipe 12.

FIG. 22 illustrates an alternative embodiment of the jaw member 112c. Where appropriate, like reference numeral with a "c" suffix have been used to indicate like components between the two embodiments of the jaw members. Each jaw member 112c includes a head 118c having a threaded aperture 120c and a stud 114c which projects from the head 118c. In the illustrated embodiment, the head 118c generally has a trapezoidal shape which sits on the ridge 106 in the corresponding channel 104 with the stud 114c extending through the channel 104.

The stud 114c includes a generally cylindrical shank 116c with a flared end 117. An elastic polyurethane or vinyl sleeve 119 sits over the shank 116c. The sleeve 119 has a diameter greater than the diameter of the flared head 117 such that the sleeve 119 rather than the flared head 117 contacts the inner wall of the fitting or pipe when installed, as discussed below.

With reference back to FIG. 21, the jaw assembly 93 in the illustrated embodiment includes four jaw members 112. Although a fewer or greater number of jaw members can be used, it has been found that four jaw members 112 spaced equal distances from one another about the plate 100 work well where the outlet or port of the return line 18 is skewed relative to the pool wall 12 (i.e., is not normal to the pool wall). This arrangement allows the plate 100 to sit flush against the pool wall 12 while at least three of the jaw members 112 engage the inner surface of the return line 18.

The jaw assembly 93 also includes a circular collar 124 which sits on the ridge 106 about the outer edge 110 of the plate 98. The collar 124 includes a plurality of circular openings 126 positioned so as to align with the apertures 120 in the jaw members 112 when the collar is positioned on the plate 98. Adjustment screws 130 are inserted through the openings 126 in the collar 124 and screwed into the threaded apertures 120 in the jaw members 112. When the adjustment screws 130 are threaded into the apertures 120 in the jaw member heads 118, the jaw members 112 are moved radially inward or outward with reference with the collar 124 and within the channels 104 to permit adjustment of the diameter of the jaw assembly 93 to accommodate various diameters of fittings and return pipes.

The edges 132 of the channels 104 in the first plate 98 desirably are beveled to prevent axial movement of the jaw members 112 in the channels. That is, the trapezoidal shape of the jaw member heads 118 corresponds with the shape between the opposing beveled edges 132 of the corresponding channel 104. When inserted into the channel 104, the bottom on the head 118 rides on the ridges 106 with the sides of the head 118 sliding beneath the beveled edges 134. In this manner, the jaw members 112 are retained in the axial direction within the channels 104.

The jaw assembly 93 can be used with various types of fittings and return lines including directional discharge fittings, threaded wall fittings, and "shotgun-type" return lines which are flush with the pool wall 12 and have no internal threads. For use with threaded wall fittings, the jaw assembly 93 is assembled as described above such that the jaw members 112 are seated within the channels 104 and the adjustment screws 130 are positioned through the aligned openings 126, 120 in the collar 124 and jaw member heads 118. The diameter between the studs 114 of the jaw members 112 is adjusted to approximate the inner diameter of the fitting using the adjustment screws 130. Rotation of an adjustment screw 130 in one direction moves the corresponding jaw member 112 in a first direction within the channel and rotation of the screw 130 in an opposite direction moves the jaw member 112 within the channel 104 in an opposite second direction. In this manner, the spacing between the jaw members 112 can be adjusted.

The threaded ends 114 of the jaw members 112 are then inserted into the fitting and the adjustment screws 130 tightened until the threaded studs 114 of the jaw members 112 engage the threads on the interior of the pipe, securing the jaw assembly 93 to the fitting. When the pool includes a directional fitting, such as the fitting 58 illustrated in FIG. 8, the directional fitting is removed and replaced with the adjustable jaw assembly 93 as described above. Once adjusted, the jaw assembly 93 may be threaded and unthreaded from the fitting by simply twisting the plates 98, 100.

When used in a pool having a "shotgun" type return, the vinyl sleeve 119 can be used in place of the threads 116, as illustrated in FIG. 22. The jaw assembly 93 thus uses the jaw members 112c illustrated in FIG. 22 and is used in the manner described above by inserting the jaw members 112c into the return and adjusting the screws 130 until the jaw members 112c tightly engage the return. In this position, the vinyl sleeves 119 are compressed against the wall of the pipe and are in frictional contact with the PVC pipe. With the jaw members 112c tightened against the pipe wall, the resultant frictional contact provides a high degree of resistance to axial forces which may be exerted on the jaw assembly 93.

Figure 23:
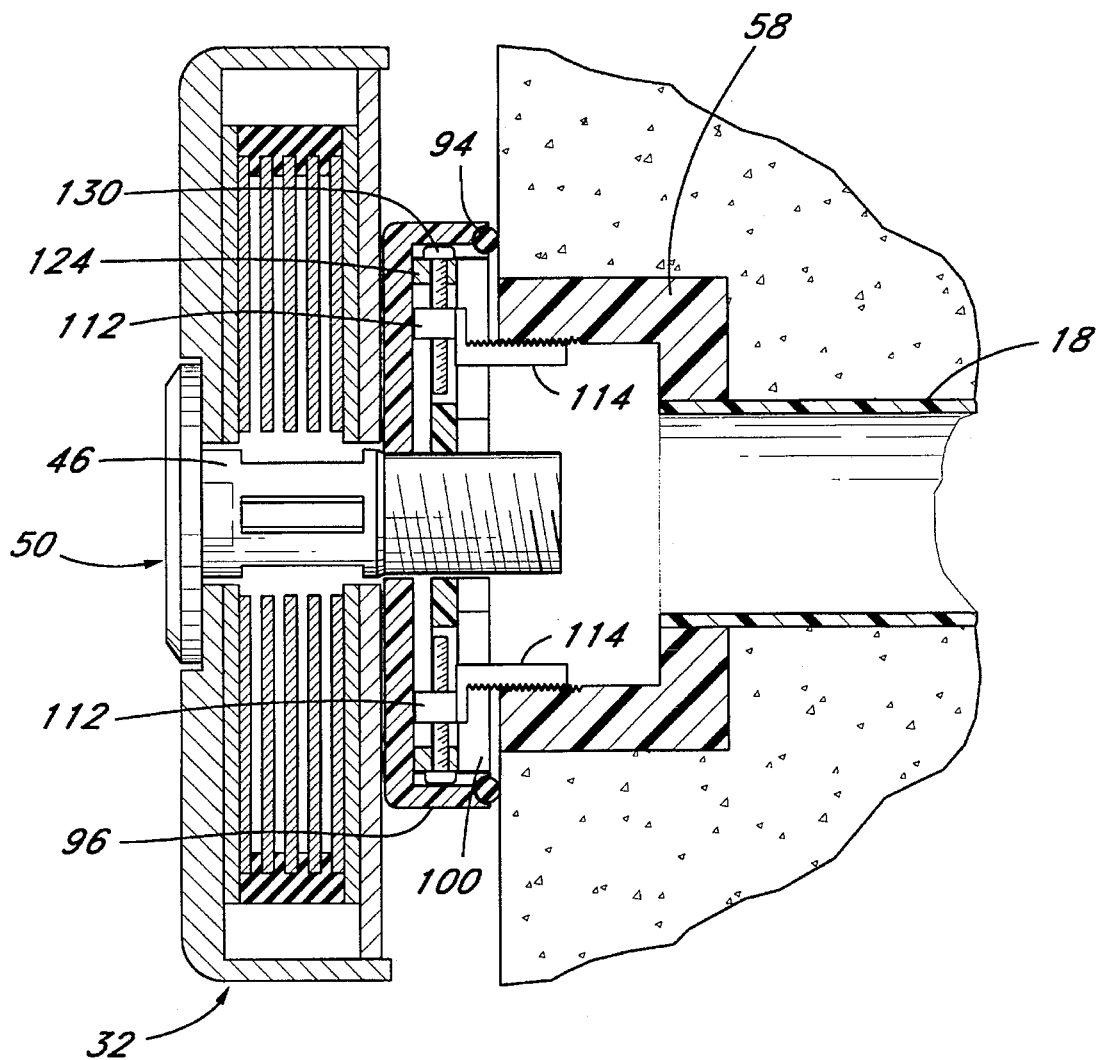
FIG. 23 is a partial cross-sectional view of the purifier of FIG. 1 attached to an existing pool fitting by the adjustable coupling of FIG. 21.

As seen in FIG. 23, the cover 96 and seal 94 are secured to the adapter 92 by the nipple 46. The seal 94 comprises an O-ring which sits in a bottom groove (not shown) formed about the end of the cover 96. The nipple 46 is inserted through a central hole 138 in the cover 96 and threaded into the central threaded opening 102 in the plates 98, 100. The shoulder 52 on the nipple abuts the cover 96, compressing the cover and seal 136 against the wall 12 of the pool. When the cover 96 is compressed against the pool wall 12 in this manner, water flows from the return line through the nipple 46 and into the purifier 10, without leaking through the cover.

The wires 62 from the purifier 10 may be run through the return line or externally along the wall 12 of the pool and over the deck for attachment to a power source. In the former case, the wires 62 may be passed through one of the channels 104 behind the jaw member 112 and routed through a recess (not shown) in the cover 96. A grommet or like seal seals the recess about the wires 62. In the latter case, the present clamp assembly 92 also can be used with the extrusion 71 (FIG. 17) in the manner described above.

As with the above embodiments, the plate 98 can include a plurality of apertures with receive clips (not shown) that are spaced about the central hole 102. The excess length or slack of the wire 62, which is necessary to remove the purifier 10 from the pool without detaching the wire from the extrusion 71 or removing the wire from the return line 18, can be wrapped around to clips for storage before attaching the pool purifier 10 to the clamp assembly 92.

With reference to FIG. 23, the enclosure 34 secures to the pool wall 12 by sliding over the nipple 46; the enclosure aperture 36 and electrode bore 32 receive the nipple. The cap 82 secures the enclosure 34 and electrolytic cell in place by threading into the end cap 49 of the nipple 46. As assembled, the enclosure 34 generally abuts against the pool wall 12 over the clamp assembly 92, and the nipple 46 communicates with the water circulation line 18.

The purifier 10, as defined, provides superior descaling characteristics. In hard water, scale deposits on the edges 80 of the nipple apertures 48 and on the edges 28 of the enclosure openings 38, 39. The diverging orifice configuration of the apertures 48 and the openings 38, 39 produces an increased flow rate through these orifices, as discussed in detail above. The increase flow rate prevents massive scale growth across the openings 38, 39 and the apertures 48. The purifier 10 additionally exhibits greater descaling qualities if used with a power supply reversing the polarity of electricity supplied to the electrodes 20, as described in U.S. Pat. No. 4,992,156. These descaling features extends the life of the purifier 10.

The purifier 10 is also easily retrofitted to a pool 14 by using the existing circulation line fitting 58. The installation, as described above, is simple and cost efficient. Through a few simple installation steps, the nipple 46 couples with the circulation line 18 and extends outwardly from the pool wall 12. The enclosure 34 slips over the nipple 46 and the cap 82 secures the enclosure 34 onto the nipple 46. Installation does not require aligning the enclosure aperture 36 with the threaded hole 65 of the directional discharger 64. Nor does the installation of the purifier 10 require simultaneously coupling the enclosure 34 and the nipple 46 with the directional discharger 64. Thus, installation is usually completed from the pool deck reaching into the pool 14.

In assembly, the enclosure 34 fits flat against the pool wall 12 or smoothly blends with the contoured pool wall 12. This unobtrusive position prevents interference with pool sweeping equipment. The low profile of the purifier 10 as installed also reduces the possibility of interfering with swimmers and is generally inconspicuous—articularly with no wires 62 visible from the outside.

Although this invention is described in terms of certain preferred embodiments, other embodiments that are apparent to those of ordinary skill in the art are also within the scope of this invention. Accordingly, the scope of the invention is intended to be defined only by the claims which follow.

What is the claimed is:

1. A pool purifier for mounting in a swimming pool having a water circulation system including a pipe which communicates with the pool through a port positioned beneath the level of water in the pool, said pool purifier comprising:

an electrolytic cell having a plurality of electrodes;

an enclosure forming a housing having an internal cavity, said electrolytic cell being disposed within said internal cavity; and a coupler releasably attached to said housing and adapted to be secured to the pool at a position overlying the port of the water circulation system, said coupler including an inner conduit which defines a water flow path between the water circulation pipe and the enclosure.

2. The pool purifier of claim 1, wherein said coupler comprises a first member which is configured to be positioned at least partially within the water circulation pipe adjacent to the port, and a second member which couples said first member to said enclosure, said first and second members configured to form said inner conduit which extends between the circulation pipe and said internal cavity of said enclosure when said first and second members are engaged.

3. The pool purifier of claim 2, wherein said first member of said coupler comprises an adjustable jaw which varies in size to adjust to a diameter of the water circulation pipe so as to engage an inner surface of the pipe and secure the first member to the pipe port.

4. The pool purifier of claim 3, wherein said first member additionally includes a plate having a plurality of channels which extend away from each other and which receive a plurality of jaw members of said adjustable jaw, said jaw members adapted to move within said channels to vary the spacing between said jaw members.

5. The pool purifier of claim 4, wherein said first member additionally comprises a stationary support which extends between said channels and includes a plurality of holes each positioned to align with one of said channels, and a plurality of adjustment screws each inserted through one of said holes of said stationary support and threaded through a threaded aperture of one of said jaw member such that rotation of said screw moves the respective jaw member within the corresponding channel.

6. The pool purifier of claim 5, wherein said jaw members each include a head and a stud which projects from said head and through said corresponding channel with said head contacting said plate, said threaded aperture of said jaw member being formed in said head.

7. The pool purifier of claim 6, wherein said stud of said jaw member includes a series of thread crests and roots which are configured to engage a corresponding standard size internal thread formed at the end of the circulation pipe.

8. The pool purifier of claim 6, wherein said jaw members each have a generally cylindrical shape.

9. The pool purifier of claim 4, wherein said plate includes a threaded aperture positioned between said channels.

10. The pool purifier of claim 3, wherein said first member additionally comprises a cover having an outer edge and a central threaded opening, and a seal which seats against said cover so as to form a seal between said cover and a portion of a pool wall which surrounds the port.

11. The pool purifier of claim 2, wherein said first member of said coupler includes a threaded opening and said second members of said coupler includes a complementary threaded shank which engages said threaded opening to connect said first and second members together.

12. The pool purifier of claim 11, wherein said first member includes an aperture formed independent of said threaded opening, said aperture being sized to receive an electrical wire connected to said electrolytic cell.

13. The pool purifier of claim 2, wherein said second member of said coupler defines a flow passage extending at least partially therethrough which communicates with said internal cavity of said housing and the water circulation pipe when engage with the housing and with the first member.

14. The pool purifier of claim 13, wherein said second member includes an elongated body portion in which said flow passage is formed, said flow passage includes an axial passage extending axially through said elongated body portion and a plurality of secondary radial passages extending radially from said axial passage within said elongated body portion.

15. The pool purifier of claim 1 additionally comprising an elongated electrical wire connected to said cell.

16. The pool purifier of claim 15, wherein said electrical wire extends into and at least partially through the water circulation pipe.

17. The pool purifier of claim 15, wherein said wire extends over the surface of a pool wall to which the coupler is attached and out of the pool.

18. The pool purifier of claim 17 additionally comprising an extrusion which covers at least a portion of said electrical wire.

19. The pool purifier of claim 15, wherein said first member of said coupler includes a passageway through which said electrical wire extends.

20. The pool purifier of claim 1, wherein said coupler comprises a first member and a second member which engages both said first member and a portion of said enclosure, said first member adapted to be secured to a surface of the pool at a location covering the port of the water circulation system and having an aperture through which water can flow between the water circulation pipe and the pool, said first and second members configured to form a water flow path between the pipe and said internal cavity when said first and second members are engaged.

21. The pool purifier of claim 20, wherein said first member comprises a plate having a diameter larger than the port of the water circulation system.

22. The pool purifier of claim 21, wherein said aperture of said plate includes internal threads which cooperate with external threads on said second member.

23. A method of installing pool purifier in a swimming pool having a water circulation system including a pipe which communicates with the pool through a port positioned beneath the level of water in the pool, said method comprising the steps of:

positioning said pool purifier beneath the surface of the pool water with an electrolytic cell of said pool purifier positioned in front of the port of said circulation system; and attaching said electrolytic cell in said position so that water from said pipe flows across said cell.

24. The method as defined in claim 23, wherein said attaching step includes positioning a first coupling member in said pipe adjacent said port, positioning a second coupling member in operative engagement with said electrolytic cell, and engaging said first and second members.

25. The method as defined in claim 24, wherein said attaching step includes adjusting said first coupling member such that at least a portion of said first coupling member has a diameter substantially matching that of the circulation pipe, said first coupling member being adjustable.

26. The method as defined in claim 24, wherein said attaching step includes inserting at least a portion of said first coupling member into an end of the circulation pipe and engaging said portion of said first coupling member with the circulation pipe.

27. The method as defined in claim 24, wherein said attaching step includes providing a layer of epoxy on a rear surface of said first member, positioning said first member over the pipe port and against a wall of the pool with a central hole in said first member being aligned with said port, and biasing said rear surface of first member against the pool wall at least until said epoxy layer cures.

28. The method as defined in claim 27, wherein said biasing involves inserting a portion of a biasing clamp through said hole in said first member and into the pipe, and contacting said first member with said clamp while said portion of said clamp is inserted into the pipe to urge said first member against the pool wall.

* * * * *